(12) United States Patent
Behrens

(10) Patent No.: US 11,827,129 B2
(45) Date of Patent: Nov. 28, 2023

(54) METHOD FOR LOCKING AN ADJUSTMENT DEVICE OF A MOTOR VEHICLE SEAT, AND MOTOR VEHICLE SEAT

(71) Applicant: Faurecia Autositze GmbH, Stadthagen (DE)

(72) Inventor: Meinhard Behrens, Wiedensahl (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 17/400,956

(22) Filed: Aug. 12, 2021

(65) Prior Publication Data

US 2021/0370813 A1     Dec. 2, 2021

Related U.S. Application Data

(62) Division of application No. 16/566,497, filed on Sep. 10, 2019, now abandoned.

(30) Foreign Application Priority Data

Sep. 10, 2018 (DE) ............... 10 2018 122 044.8

(51) Int. Cl.
*B60N 2/42*     (2006.01)
*B60N 2/433*     (2006.01)
*B60N 2/00*     (2006.01)

(52) U.S. Cl.
CPC ............... *B60N 2/43* (2013.01); *B60N 2/002* (2013.01); *B60N 2/433* (2013.01)

(58) Field of Classification Search
CPC .......... B60N 2/43; B60N 2/002; B60N 2/433
See application file for complete search history.

(56) References Cited

U.S. PATENT DOCUMENTS

| | | |
|---|---|---|
| 9,533,651 B1 | 1/2017 | Ohno et al. |
| 2009/0265063 A1 | 10/2009 | Kasugai et al. |
| 2018/0222435 A1 | 8/2018 | Fukawatase et al. |
| 2020/0062116 A1 | 2/2020 | Yabunaka et al. |

FOREIGN PATENT DOCUMENTS

| | | | |
|---|---|---|---|
| CN | 105905061 B | * | 8/2018 |
| DE | 10211400 A1 | | 10/2003 |
| DE | 10312119 A1 | * | 10/2003 |
| DE | 10306827 A1 | | 9/2004 |
| DE | 10306828 A1 | | 9/2004 |
| DE | 102006030729 A1 | | 1/2008 |

\* cited by examiner

*Primary Examiner* — Anthony D Barfield
(74) *Attorney, Agent, or Firm* — Henry M. Feiereisen LLC

(57) ABSTRACT

In a method for locking an adjustment device of a motor vehicle seat, a usage situation and/or danger situation is detected. In response to the detected usage situation and/or danger situation, a locking action for the adjustment device is selected, and the selected locking action for the adjustment device is executed.

13 Claims, 6 Drawing Sheets

METHOD FOR LOCKING AN ADJUSTMENT DEVICE OF A MOTOR VEHICLE SEAT, AND MOTOR VEHICLE SEAT

CROSS-REFERENCES TO RELATED APPLICATIONS

This application is a divisional of prior filed copending U.S. patent application Ser. No. 16/566,497, filed Sep. 10, 2019, the priority of which is hereby claimed under 35 U.S.C. § 120 and which claims the priority of German Patent Application, Serial No. 10 2018 122 044.8, filed Sep. 10, 2018, pursuant to 35 U.S.C. 119(a)-(d).

The contents of U.S. patent application Ser. No. 16/566,497 and German Patent Application, Serial No. 10 2018 122 044.8 are incorporated herein by reference in their entireties as if fully set forth herein.

BACKGROUND OF THE INVENTION

The present invention relates to a method for locking an adjustment device of a motor vehicle seat, and to a motor vehicle seat.

The following discussion of related art is provided to assist the reader in understanding the advantages of the invention, and is not to be construed as an admission that this related art is prior art to this invention.

Motor vehicle seats and the components thereof are adjustable in various ways, in such a way that a passenger can adjust the motor vehicle seat depending on his body shape, body size and bodyweight. Adjustment options of this type not only increase the comfort for the passenger, but also increase his safety in the event of an accident. For example, the adjustable-inclination backrest, a longitudinal adjustment system of the motor vehicle seat, a height adjustment system of the motor vehicle seat, an adjustment system for the angle of inclination of the seat surface, a seat depth adjustment system, pivoting of the motor vehicle seat about the vertical axis thereof, headrests that are adjustable in the longitudinal and vertical directions, and many more are possible.

In particular, in relation to autonomously controlled motor vehicles, rest positions of the motor vehicle seat can be set, in which for example the backrest is adjusted into a virtually horizontal position or the motor vehicle seat is pivoted about the vertical axis thereof in such a way that a passenger faces the interior of the motor vehicle. These settings of the motor vehicle seat, which are individual to each passenger, can be stored as a configuration in a storage means in the motor vehicle. The passenger can thus select the configuration suited to him before or upon entering the motor vehicle, and set the motor vehicle seat in the selected configuration automatically by way of the motor adjustment.

Usually, in motor vehicle seats that are adjustable in this manner, a locking system of the adjustment device primarily in the longitudinal direction, known as a crash stop, is installed, and produces additional stopping arresting of the motor vehicle seat during an accident. In this way, it is ensured that the forces occurring in a crash are introduced into the body of the motor vehicle, the motor vehicle seat is securely held and is not adjusted, and thus the belt restraint system and airbag system can optimally restrain the passenger.

Heretofore, conventional locking systems have mane shortcomings. The locking systems merely lock the vertical adjustment of the motor vehicle seat. Further components of the motor vehicle seat, such as the backrest, which experiences strong forces in the event of a collision in the longitudinal direction, are not locked. In addition, the type of accident (for example, side collision) and the intensity of the forces acting on the motor vehicle seat and the passenger thereof are not detected and taken into account. These are therefore not "smart" locking systems; in other words, they lock the vertical adjustment automatically in the event of an accident, independently of whether the motor vehicle seat is occupied by a passenger. The weight, size and age of the passenger are also not detected.

It would therefore be desirable and advantageous to provide an improved method for locking an adjustment device of a motor vehicle seat and an improved motor vehicle seat to obviate prior art shortcomings and to lock precisely a component or components of the motor vehicle seat so as to ensure protection for the passenger or passengers by discerning the type of accident, the intensity of the forces acting on the motor vehicle seat, the orientation of the motor vehicle seat, occupancy, and the weight, size and age of the passenger.

SUMMARY OF THE INVENTION

According to one aspect of the present invention, a method for locking an adjustment device of a motor vehicle seat includes detecting a usage situation and/or danger situation, selecting a locking action for the adjustment device; and carrying out the selected locking action for the adjustment device.

A method according to the invention for locking an adjustment device of a motor vehicle seat has three method steps. In a first method step, a usage situation and/or danger situation is detected. In a second method step, a locking action for the adjustment device is selected. The locking action contains information as to which adjustment device is locked at what time. The locking action thus establishes the adjustment device or devices that are locked and can no longer be moved at an established time. The selection is made on the basis of the danger situation and the usage situation. Depending on the type of danger situation and/or usage situation, the locking action is selected that provides the passenger of the motor vehicle seat with the best possible protection for the collision. In the third method step, the selected locking action for the adjustment device is carried out. Advantageously, optimization of energy management and of the deformation behavior of the motor vehicle seat is achieved and implemented by way of the situation-based selection of the locking action.

In a simplest case, the usage situation includes the information of whether the motor vehicle seat is occupied by a passenger. The usage situation also includes the information which motor vehicle seats in the motor vehicle are occupied. In particular, occupancy of the front and rear seats in the motor vehicle is detected. In the event that the motor vehicle seat is occupied, the seat situation and seat position of the passenger are detected and thus become part of the usage situation. Thus, for example the situation of the seat longitudinal adjustment system, the angle of inclination of the backrest, the position of the seat height adjustment system and/or the situation of the headrest are detected. Moreover, the adjustment of the motor vehicle seat about the vertical axis thereof and an adjustment of the angle of inclination of the seat surface and the seat depth thereof can be detected.

The detection of a danger situation includes in particular the information of whether a collision is immediately imminent, this being known as a pre-crash situation. The danger situation may be a front collision, a rear collision and/or a side collision. The collision speed is also incorporated into the detection of the danger situation.

To detect the usage situation and the danger situation, the sensor systems installed in the motor vehicle are accessed. The sensors may for example be distance sensors, which also detect relative speeds, and sensors installed in the motor vehicle seat, which detect occupancy.

According to another advantageous feature of the present invention, the usage situation and/or danger situation can be analyzed. The detected usage situation is analyzed together with the danger situation for the possible threat to the passenger or passengers. The analysis of the danger situation is carried out while taking into account the type of accident (front collision, rear collision, side collision) and the collision speed. If for example a front collision is imminent, the possible threat to the passengers is different than if a collision to the rear of the motor vehicle is imminent. The analysis of the usage situation is carried out in relation to the occupancy of the motor vehicle seats installed in the motor vehicle, in other words which motor vehicle seats are occupied and the position thereof in the motor vehicle.

According to another advantageous feature of the present invention, the locking action can be selected in response to the analysis of the detected usage situation and/or the detected danger situation. The analysis of the danger situation is carried out while taking into account the type of the accident (for example front collision, rear collision, side collision) and the collision speed. When for example a front collision is imminent, the possible threat to the passenger is different than when a collision to the rear of the motor vehicle is imminent. The analysis of the usage situation is carried out in terms of the occupancy of the motor vehicle seats installed in the motor vehicle, in other words while motor vehicle seats are occupied and the position thereof in the motor vehicle. The locking action is selected depending on the type of danger situation and/or usage situation so as to provide the passenger of the motor vehicle seat with the greatest possible protection in the event of the collision.

According to another advantageous feature of the present invention, locking actions for two or more adjustment devices can be selected. The analysis of the detected usage situation and/or the detected danger situation may have the result that a plurality of adjustment devices have to be locked so as to provide the passenger with optimum protection, in particular when a plurality of passengers in the vehicle are occupying the motor vehicle seats. In this case, locking actions for a plurality of adjustment devices on one or more motor vehicle seats are selected.

According to another advantageous feature of the present invention, a locking condition for an adjustment device can be detected from the detected usage situation and/or danger situation. The locking condition includes information as to at what time a particular locking action is activated. This information is determined from the usage situation and the danger situation. In the event of a collision, it may be expedient for example to activate a particular adjustment device at a later time than another adjustment device.

According to another advantageous feature of the present invention, the locking device can be actuated. In a more advanced configuration of the invention, the locking device can be actuated by a safety ECU (electronic control unit). The safety ECU is usually installed in the motor vehicle itself, and controls further safety devices installed in the motor vehicle, for example the airbag and belt tensioners.

According to another advantageous feature of the present invention, the locking action can be implemented electromagnetically, pyrotechnically, by motor and/or by means of a shape-memory alloy.

According to another advantageous feature of the present invention, the usage situation can be detected by detecting a person-specific feature. In a simplest case, the usage situation includes the information of whether the motor vehicle seat is occupied by a passenger. When the motor vehicle seat is occupied, the seat situation and seat position of the passenger are detected and thus become part of the usage situation. Thus, for example the situation of the seat longitudinal adjustment system, the angle of inclination of the backrest, the position of the seat height adjustment system and/or the situation of the headrest can be detected. Moreover, the adjustment of the motor vehicle seat about the vertical axis thereof and an adjustment of the angle of inclination of the seat surface and the seat depth thereof can be detected. By detecting person-specific features of the passenger or passengers, situation-based actuation of the locking device is implemented individually for each passenger, in such a way that the greatest possible safety of the passenger or passengers is provided.

According to another advantageous feature of the present invention, the person-specific feature can include different classifications into weight, size and/or age categories. In particular the weight and size of the passengers affect the usage situation. Greater inertia forces act on a heavier passenger than on a lighter passenger. The body size of the passenger predominantly affects the situation of the head support. The analysis of the usage situation takes into account these person-specific features of the passenger. The actuation of the locking device is therefore implemented individually for each passenger, in such a way that the greatest possible safety of the passenger or passengers is provided.

According to another advantageous feature of the present invention, the usage situation can be detected by detecting a position of a passenger in the motor vehicle. The usage situation includes the information of which motor vehicle seats in the motor vehicle are occupied. In particular, occupancy of the front and rear seats in the motor vehicle is detected. When the motor vehicle seat is occupied, the seat situation and seat position of the occupant are detected and thus become part of the usage situation. Thus, for example the situation of the seat longitudinal adjustment system, the angle of inclination of the backrest, the position of the seat height adjustment system and/or the situation of the headrest are detected. Moreover, the adjustment of the motor vehicle seat about the vertical axis thereof and an adjustment of the angle of inclination of the seat surface and the seat depth thereof can be detected.

According to another advantageous feature of the present invention, when the position of the passenger is detected, a distinction can be made between the motor vehicle seat used by the passenger and the seat situation or seat position of the passenger upon the respective motor vehicle seat. The usage situation includes the information of which motor vehicle seats in the motor vehicle are occupied. In particular, occupancy of the front and rear seats in the motor vehicle is detected. If the motor vehicle seat is occupied, the seat situation and seat position of each individual passenger are detected and distinguished from the occupancy. In this way, the optimum locking action can be selected individually for each motor vehicle seat.

According to another advantageous feature of the present invention, the danger situation can be detected by classifying the danger situation. The data detected by the sensors installed in the motor vehicle are analyzed for the type of danger situation and classified in the ECU. In particular, in the ECU it is analyzed and classified whether a collision is immediately imminent, this being known as a pre-crash situation. The danger situation is classified in terms of the threat potential for the passengers.

According to another advantageous feature of the present invention, the danger situation can be classified by distinguishing a crash type. The danger situation may be a front collision, a rear collision, a collision after descending a slope and/or a side collision. In particular, in the ECU it is analyzed and classified whether a collision is immediately imminent, this being known as a pre-crash situation. The danger situation is classified in terms of the threat potential for the passengers.

According to another advantageous feature of the present invention, the classification of the danger situation can distinguish between pre-crash, front crash, rear crash, side impact and/or collision speeds. The collision speed is also analyzed and classified. Thus, for example, for a higher collision speed, a higher threat potential is to be assumed for the passenger of the motor vehicle seat than for lower collision speeds.

In a refinement of the present invention, crash situations may also occur in which it is most favorable for the risk of injury to the passenger if only the locking systems on one side of the motor vehicle seat are actuated, but the locking systems on the other side of the motor vehicle seat remain unlocked.

According to another aspect of the present invention, a motor vehicle seat, includes a seat component, an adjustment device for adjusting the seat component, said adjustment device including a locking device, and an ECU configured for actuating the locking device.

A motor vehicle seat according to the invention for motor vehicles has an adjustment device for adjusting a seat component. For example, the adjustable-inclination backrest, a longitudinal adjustment system of the motor vehicle seat, a height adjustment system of the motor vehicle seat, an adjustment system for the angle of inclination of the seat surface, a seat depth adjustment system, pivoting of the motor vehicle seat about the vertical axis thereof, and headrests that are adjustable in the longitudinal and vertical directions are possible.

According to the present invention, the adjustment device has a locking device, which can be actuated by means of an ECU. When large forces occur for example during an accident, the adjustment device is locked rigidly in such a way that the forces occurring in a crash are introduced into the body of the motor vehicle, the motor vehicle seat is securely held and is not adjusted, and thus the belt restraint system and airbag system can optimally restrain the passenger. As a result of the actuation by means of an ECU, the adjustment device that provides the passenger of the motor vehicle seat with the greatest possible protection in the event of a collision is locked.

According to another advantageous feature of the present invention, the motor vehicle seat can have two or more adjustment devices, which each have a locking device, with the locking devices being actuable by one or more ECUs. The analysis of the detected usage situation and/or the detected danger situation by means of the ECUs may have the result that a plurality of adjustment devices have to be locked so as to provide the passenger with optimum protection, in particular when a plurality of passengers in the vehicle are occupying the motor vehicle seats. In this case, locking actions for a plurality of adjustment devices on one or more motor vehicle seats are selected.

According to another advantageous feature of the present invention, the locking devices can be actuated separately from one another by one or more ECUs using different control commands. The analysis of the detected usage situation and/or the detected danger situation by means of the ECUs may have the result that a plurality of adjustment devices has to be locked so as to provide the passenger with optimum protection. In this case, locking actions for a plurality of adjustment devices on one or more motor vehicle seats are selected separately from one another.

According to another advantageous feature of the present invention, the locking device can be formed as an electric, electromagnetic, pyrotechnic or motor-driven actuator and/or formed from a shape-memory alloy.

According to another advantageous feature of the present invention, the motor vehicle seat and/or the motor vehicle can have sensors by means of which the size, the weight and/or the seat position of passengers and/or the seat occupancy are detectable. In particular the weight and size of the passenger affect the usage situation. Greater inertia forces act on a heavier passenger than on a lighter passenger. The body size of the passenger predominantly affects the situation of the head support. The sensors detect these person-specific features of the passenger. The actuation of the locking device is therefore implemented individually for each passenger, in such a way that the greatest possible safety of the passenger or passengers is provided.

According to another advantageous feature of the present invention, the motor vehicle can have sensors by means of which danger situations can be distinguished. To detect the danger situation, sensor systems installed in the motor vehicle are accessed. The sensors may for example be distance sensors, which also detect relative speeds.

According to another advantageous feature of the present invention, the distinguishable danger situations include pre-crash, front-crash, rear crash, side impact and/or collision speeds. When for example a front collision is imminent, the possible thread to the passenger is different than when a collision to the rear of the motor vehicle is imminent. Likewise, for a higher collision speed, a higher threat potential is to be assumed for the passenger of the motor vehicle seat than for lower collision speeds. The locking action is selected depending on the type of danger situation so as to provide the passenger of the motor vehicle seat with the greatest possible protection in the event of the collision.

According to another advantageous feature of the present invention, the motor vehicle and/or the motor vehicle seat can have an ECU, by means of which a control command for locking can be generated for a locking device on the basis of the existing danger situation and/or usage situation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
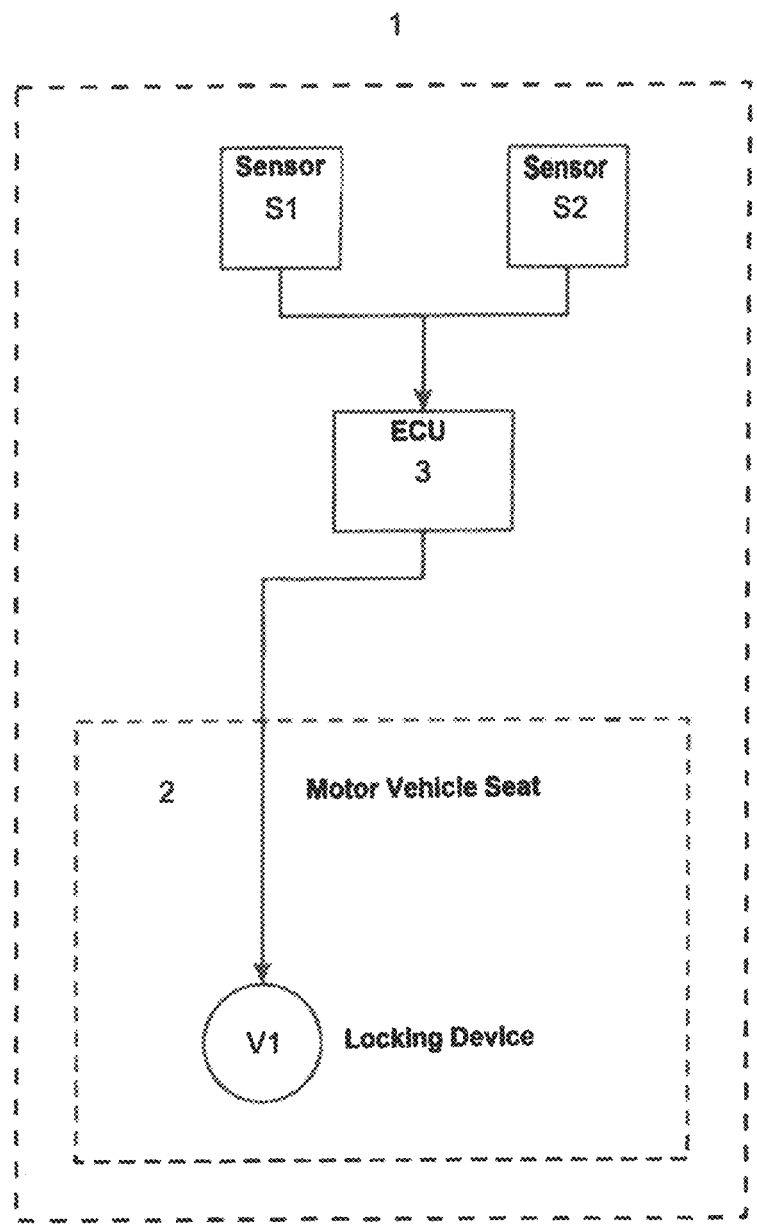
FIG. 1 is a block diagram of one embodiment of a method for locking an adjustment device in a motor vehicle in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block diagram of one embodiment of a method for locking an adjustment device in a motor vehicle 1 in accordance with the present invention. The motor vehicle 1 has two sensors S1, S2, which each detect a region in front of and behind the motor vehicle 1 and are configured as distance and speed sensors. The data detected by the sensors S1, S2 are passed from the sensors S1, S2 to the ECU 3 and checked for a possible danger situation in the ECU 3. The ECU 3 is connected to a locking device V1 in the motor vehicle seat 2 via a data connection, and actuates said device.

A method according to the invention for locking an adjustment device V1 of a motor vehicle seat 2 is implemented in three steps. In a first method step, a danger situation is detected. For this purpose, the data detected by the sensors S1, S2 are analyzed in the ECU 3, in particular as to whether a danger situation is present and which one. The data detected by the sensors S1, S2 are analyzed and classified in the ECU 3 for the type of danger situation. In particular, in the ECU 3 it is analyzed and classified whether a collision is immediately imminent, this being known as a pre-crash situation. The danger situation may be a front collision, a rear collision and/or a side collision. The collision speed is also analyzed and classified. Thus, for example, for a higher collision speed, a higher threat potential is to be assumed for the passenger of the motor vehicle seat 2 than for lower collision speeds.

In a second method step, the locking action for the adjustment device is selected by means of the ECU 3 on the basis of the classification of the danger situation. Depending on the type of danger situation and the collision speed, the locking action is selected that provides the occupant of the motor vehicle seat 2 with the greatest possible protection in the event of a collision.

In a third method step, the selected locking action for the adjustment device is carried out. For this purpose, the ECU 3 actuates the actuator of the locking device V1. The actuator moves the locking device V1 electromagnetically, pyrotechnically, by motor and/or by means of a shape-memory alloy.

Figure 2:
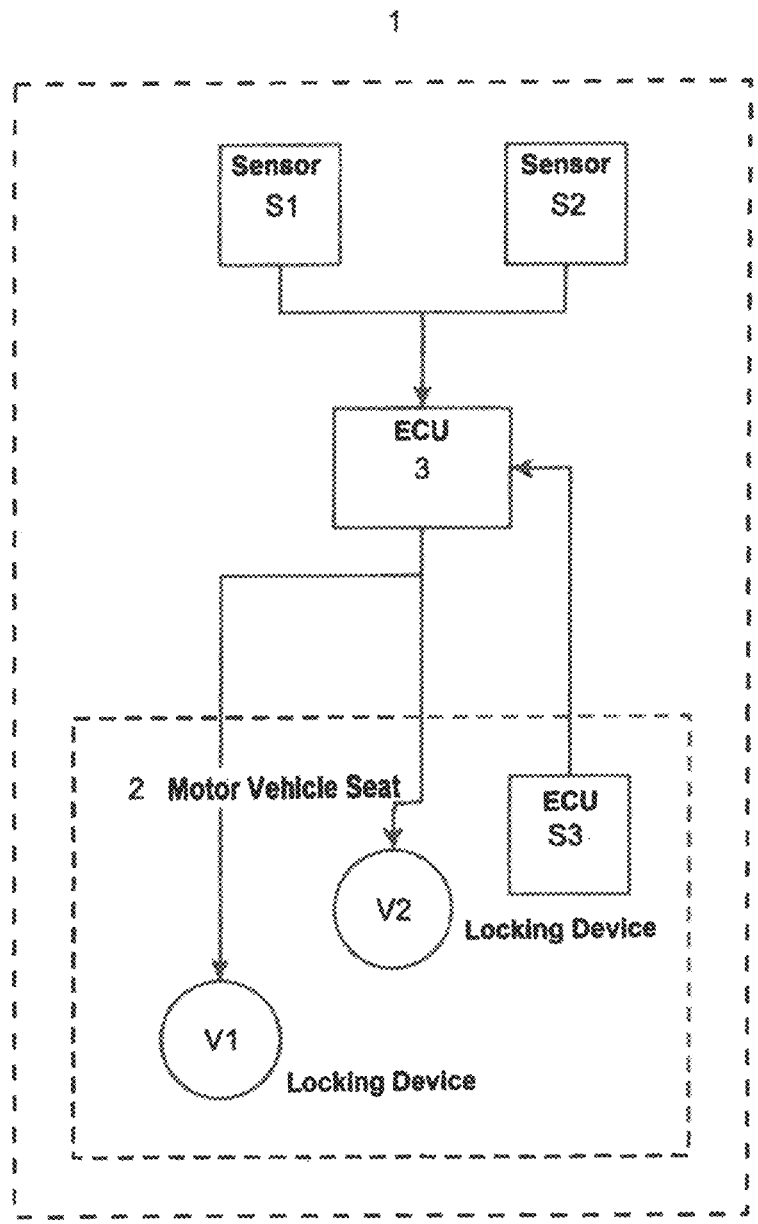
FIG. 2 is a block diagram of another embodiment of a method for locking an adjustment device in a motor vehicle in accordance with the present invention.

FIG. 2 shows a block diagram of another embodiment of a method for locking an adjustment device in a motor vehicle 1 in accordance with the present invention. Parts corresponding with those in FIG. 1 are denoted by identical reference numerals and not explained again. The description below will center on the differences between the embodiments. In this embodiment, the motor vehicle 1 uses three sensors S1, S2, S3 and two locking devices V1, V2, with the two sensors S1, S2 configured, for example, to detect a region in front of and behind the motor vehicle 1 respectively and configured as distance sensors. The data detected by the sensors S1, S2 are passed from the sensors S1, S2 to the ECU 3 checked in the ECU 3 for a possible danger situation. The third sensor S3 is installed in the motor vehicle seat 2 itself and detects data of the usage situation of the motor vehicle seat 2 and passes them to the ECU 3. The ECU 3 is connected to the two locking devices V1, V2 in the motor vehicle seat 2 via a data connection, and actuates the locking devices V1, V2.

In accordance with the embodiment of FIG. 2, a method according to the invention for locking the adjustment devices V1, V2 of a motor vehicle seat 2 is also implemented in three steps. In a first method step, a danger situation is detected. For this purpose, the data detected by the sensors S1, S2 are analyzed in the ECU 3, in particular as to whether a danger situation is present and which one. The data detected by sensors S1, S2 are analyzed and classified in the ECU 3 for the type of danger situation. In particular, in the ECU 3 it is analyzed and classified whether a collision is immediately imminent, this being known as a pre-crash situation. The danger situation may be a front collision, a rear collision and/or a side collision. The collision speed is also analyzed and classified.

The sensor S3 detects the usage situation of the motor vehicle seat and passes this to the ECU 3. In a simplest case, the usage situation includes the information of whether the motor vehicle seat 2 is occupied by a passenger. The usage situation also includes the information of which motor vehicle seats 2 in the motor vehicle 1 are occupied. In particular, occupancy of the front and rear seats in the motor vehicle 1 is detected. In the event that the motor vehicle seat 2 is occupied, the seat situation and seat position of the passenger are detected by means of the sensor S3 and thus become part of the usage situation. Thus, for example the situation of the seat longitudinal adjustment system 10, the angle of inclination of the backrest 5, the position of the seat height adjustment system 9 and/or the situation of the headrest 4 are detected. Moreover, the adjustment of the motor vehicle seat 2 about the vertical axis thereof and an adjustment of the angle of inclination of the seat surface 6 and the seat depth thereof can be detected.

In addition, person-specific features of the passenger are detected and classified. The person-specific features include in particular weight, size and age specifications of the passenger. These detected data are passed from the sensor S3 to the ECU 3 and are part of the usage situation. In the ECU 3, the danger situation and the usage situation are analyzed and classified in terms of the threat potential for the passenger. When the usage situation is such that the motor vehicle seats 2 in the second row of the motor vehicle 1 are occupied by passengers, generally speaking all locking devices V1, V2 are locked. It has been found that injuries are reduced for passengers in the second row in this case.

In a second method step, the locking action for the adjustment devices is selected by means of the ECU 3 on the basis of the classification of danger situation and the usage situation. Depending on the type of danger situation, usage situation and collision speed, the locking action is selected that provides the passenger of the motor vehicle seat 2 with the greatest possible protection in the event of a collision. Thus, it is possible for both locking devices V1, V2, only one locking device (V1 or V2), or neither of the locking devices V1, V2 to be selected. Moreover, the locking devices V1, V2 may be selected with a time offset from one another.

In a third method step, the selected locking action for the adjustment device is carried out. For this purpose, the ECU 3 actuates the associated actuator or actuators of the locking devices V1, V2 that were selected as a locking action in the second method step. The actuator moves one or both locking devices V1, V2 electromagnetically, pyrotechnically, by motor and/or by means of a shape-memory alloy.

Figure 3:
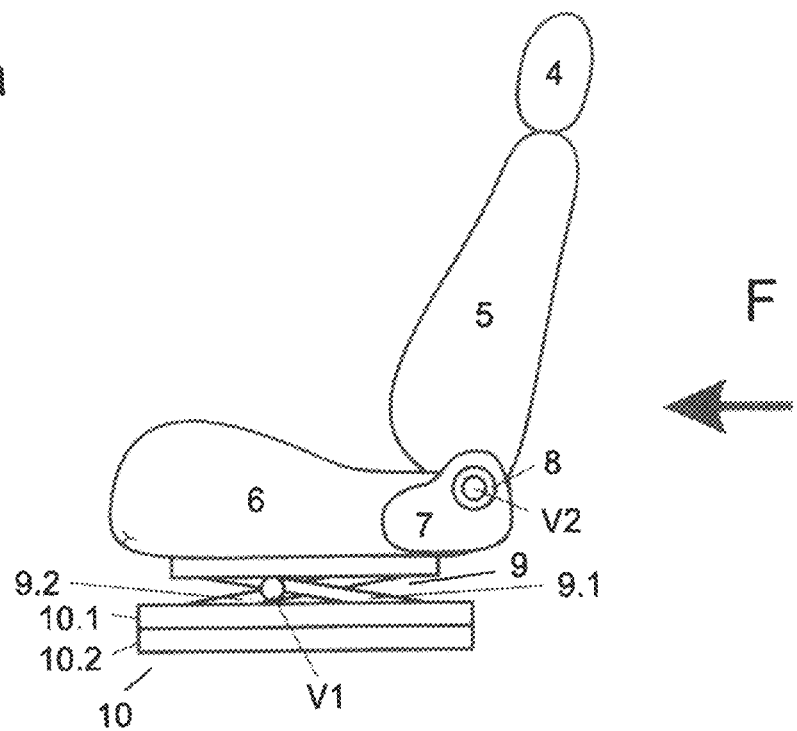
FIG. 3a is a schematic side view of a motor vehicle seat according to the invention during a rear collision and backrest upright.
FIG. 3b is a schematic side view of a motor vehicle seat according to the invention during a front collision and backrest upright.
Figure 3:
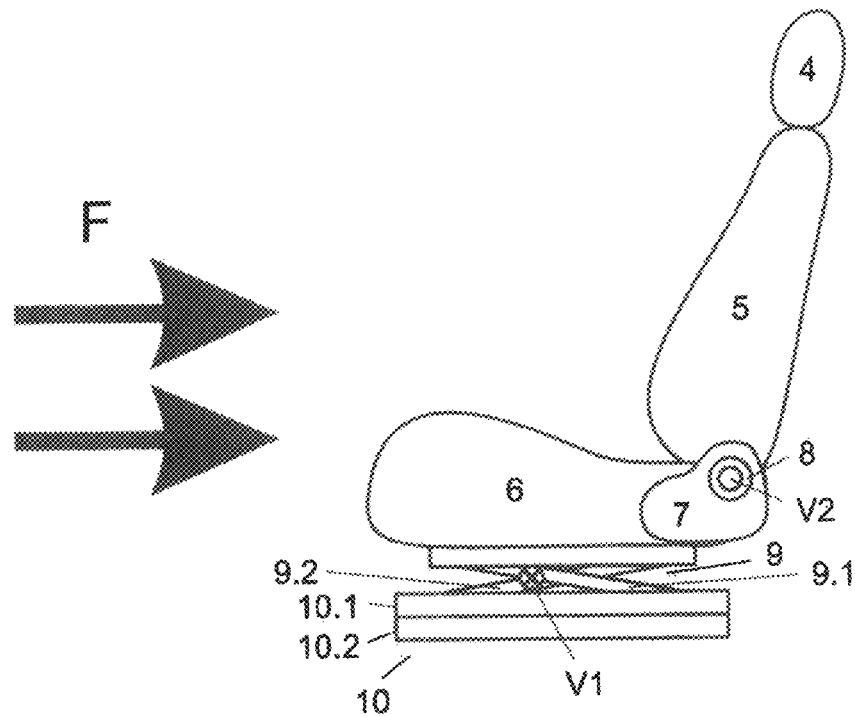

FIGS. 3a and 3b show side views of a motor vehicle seat 2 according to the invention, which is exposed to a rear collision (FIG. 3a) and to a front impact at a high collision speed (FIG. 3b). The motor vehicle seat 2 has a seat surface 6, an adjustment system 8 of the backrest inclination and a headrest 4. In this embodiment, the adjustable-inclination backrest 5 is in the upright position. The motor vehicle seat 2 is connected to the floor of the motor vehicle 1 via a seat longitudinal adjustment system 10, which has an upper rail 10.1 and a lower rail 10.2. The seat height adjustment system 9 has a rear 9.1 and a front kinematic system 9.2. In this embodiment, the seat height adjustment system 9 has the locking device V1, the adjustment system for the backrest inclination 8, and the locking device V2.

In a rear collision (FIG. 3a), the force action F affects the motor vehicle seat 2 from the rear. In this scenario, the locking devices V1, V2 are not locked. It has been found that the risk of injury, for example the danger of whiplash, is lowest for the passenger. As a result of the locking, the rotational movement of the passenger's pelvis is minimized. Complete locking would have a negative influence on the behavior of the structure of the motor vehicle seat 2 in the event of a rear impact at low speeds. The low energy input into the structure of the motor vehicle seat 2 would have negatively affect the bone structure of the passenger in the event of whiplash.

In the event of a front collision (FIG. 3b), the force action F affects the motor vehicle seat 2 from the front. In this scenario, the locking device of the seat height adjustment system V1 is locked, but the adjustment system for the backrest inclination 8 is not locked by the adjustment device V2. As a result of this action, the collision energy is dissipated in the kinematics 9.1, 9.2 of the seat height adjustment system 9. It has been found that the spinal compression of the passenger is lowest as a result of this action.

Figure 4A:
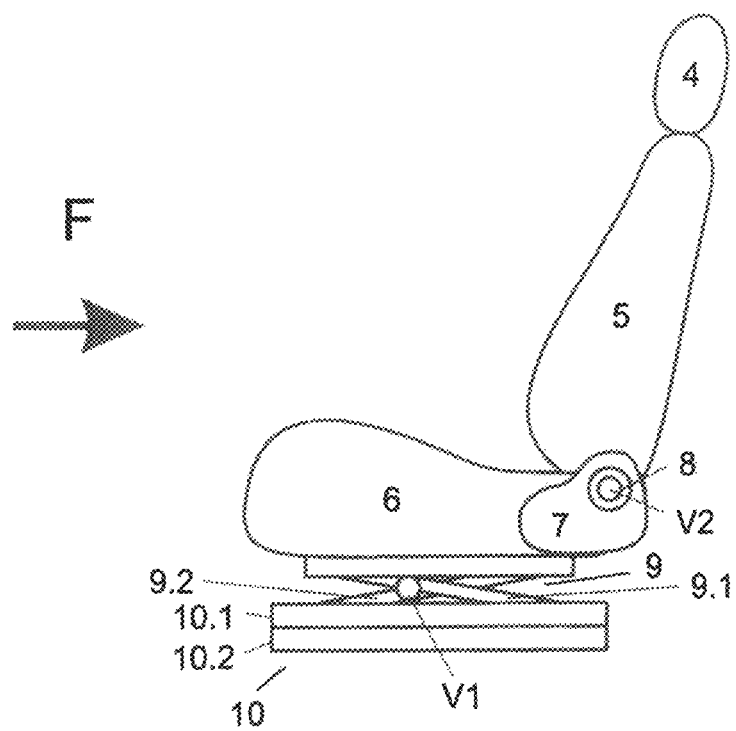
FIG. 4a is a schematic side view of a motor vehicle seat according to the invention during a front collision at a high angle of inclination of the backrest and low collision speed.
Figure 4B:
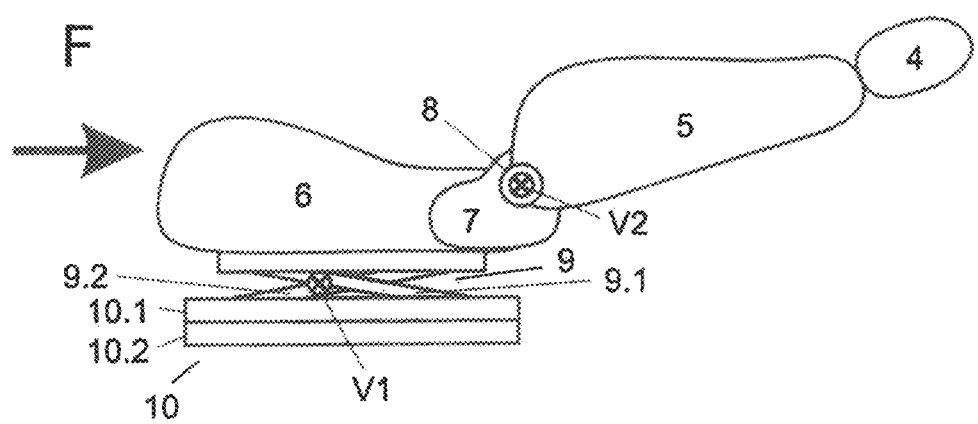
FIG. 4b is a schematic side view of a motor vehicle seat according to the invention during a front collision at a low angle of inclination of the backrest and low collision speed.

FIGS. 4a and 4b are side views of a motor vehicle seat 2 according to the invention, which is exposed to a front collision at a low (FIG. 4a) and a high (FIG. 4b) angle of inclination of the backrest 5 and a low collision speed. The motor vehicle seat 2 has a seat surface 6, an adjustment system 8 for the backrest inclination, and a headrest 4, as well as an adjustable-inclination backrest 5. The motor vehicle seat 2 is connected to the floor of the motor vehicle 1 via a seat longitudinal adjustment system 10, which has an upper rail 10.1 and a lower rail 10.2. The seat height adjustment system 9 has a rear 9.1 and a front kinematic system 9.2. In this embodiment, the seat height adjustment system 9 has the locking device V1, the adjustment system for the backrest inclination 8, and the locking device V2. In this embodiment, the force action F affects the motor vehicle seat 2 from the front, and the collision speed is low.

When the backrest 5 is upright (FIG. 4a), locking devices V1, V2 are not locked in this scenario. It has been found that the risk of injury, for example the danger of whiplash, is lowest for the passenger. At a high angle of inclination of the backrest 5 (FIG. 4b), for example in a rest position of the motor vehicle seat 2, the locking devices V1, V2 are locked. The danger of the passenger sliding through under the belt restraint system is thus reduced, and the belt restraint system can better restrain the passenger.

Figure 5A:
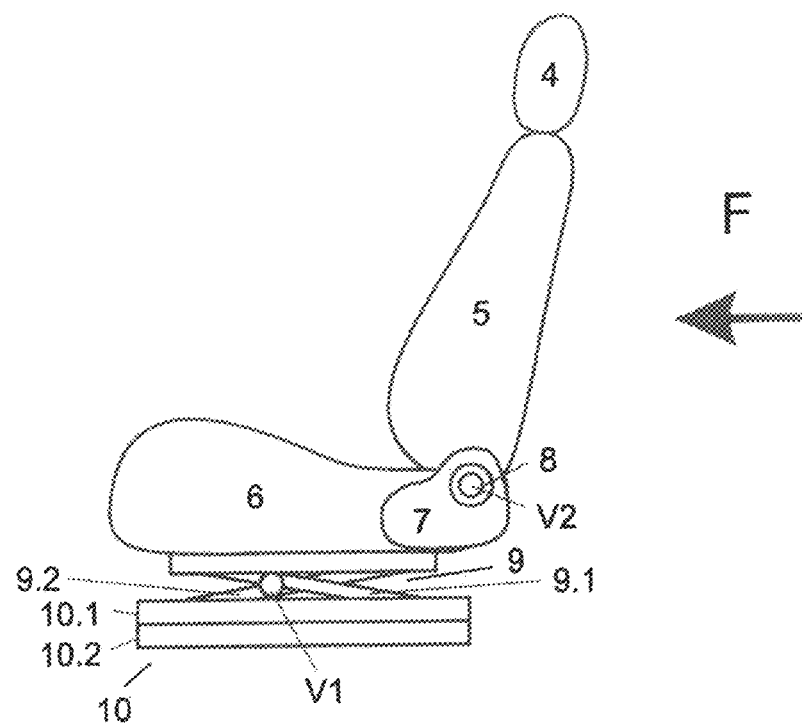
FIG. 5a is a schematic side view of a motor vehicle seat according to the invention during a rear collision at a low angle of inclination of the backrest and low collision speed.
Figure 5B:
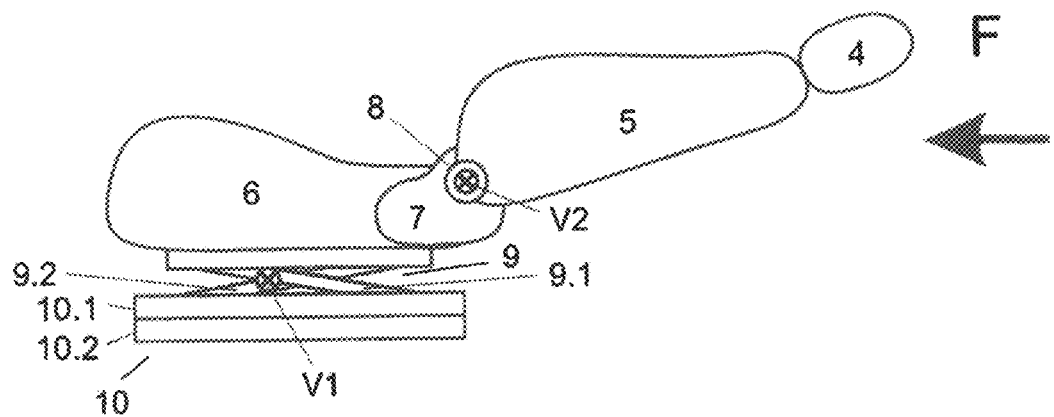
FIG. 5b is a schematic side view of a motor vehicle seat according to the invention during a rear collision at a high angle of inclination of the backrest and low collision speed.

FIGS. 5a and 5b are side views of a motor vehicle seat 2 according to the invention, which is exposed to a rear collision at a low (FIG. 5a) and a high (FIG. 5b) angle of inclination of the backrest 5 and a low collision speed. The motor vehicle seat 2 has a seat surface 6, an adjustment system 8, and a headrest 4, as well as an adjustable-inclination backrest 5. The motor vehicle seat 2 is connected to the floor of the motor vehicle 1 via a seat longitudinal adjustment system 10, which has an upper rail 10.1 and a lower rail 10.2. The seat height adjustment system 9 has a rear 9.1 and a front kinematic system 9.2. In this embodiment, the seat height adjustment system 9 has the locking device V1, the adjustment system for the backrest inclination 8, and the locking device V2. In this embodiment, the force action F affects the motor vehicle seat 2 from the front, and the collision speed is low.

When the backrest 5 is upright (FIG. 5a), locking devices V1, V2 are not locked in this scenario. It has been found that the risk of injury, for example the danger of whiplash, is lowest for the passenger. As a result of the locking, the rotational movement of the passenger's pelvis is minimized. Complete locking would have a negative influence on the behavior of the structure of the motor vehicle seat 2 in the event of a rear impact. The low energy input into the structure of the motor vehicle seat 2 would negatively affect the bone structure of the passenger in the event of whiplash. At a high angle of inclination of the backrest 5 (FIG. 5b), for example in a rest position of the motor vehicle seat 2, the locking devices V1, V2 are locked. The danger of the passenger sliding through under the belt restraint system is thus reduced, and the belt restraint system can better restrain the passenger.

Figure 6A:
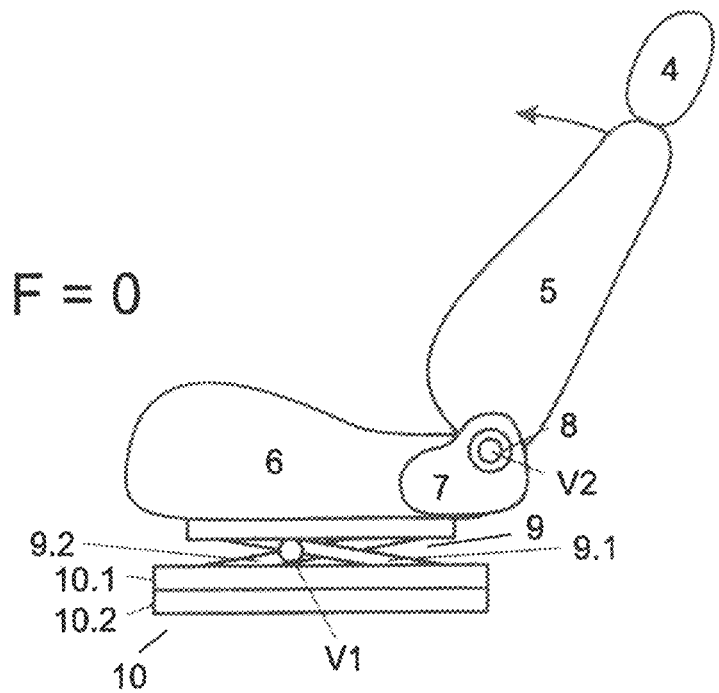
FIG. 6a is a schematic side view of a motor vehicle seat according to the invention in the event of a pre-crash at a medium angle of inclination of the backrest and low collision speed.
Figure 6B:
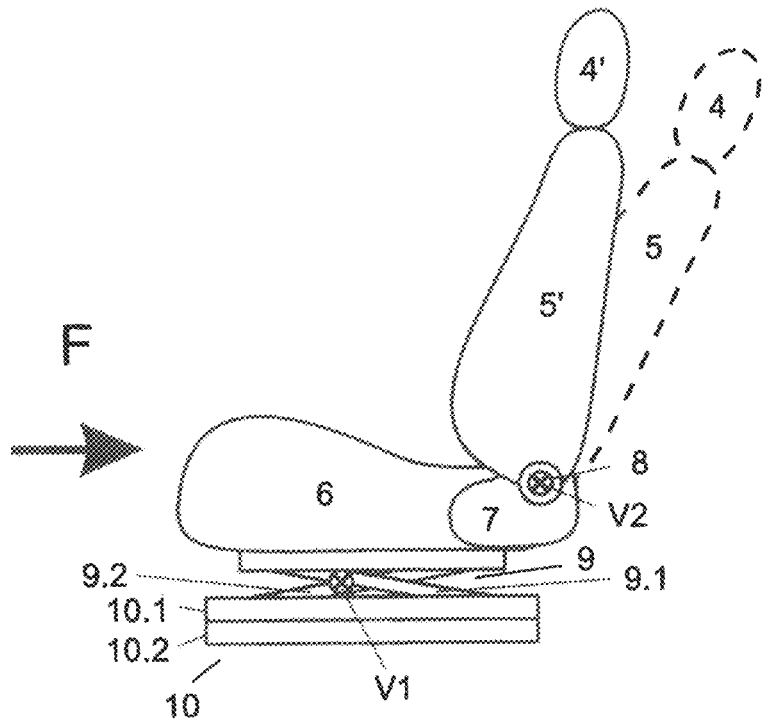
FIG. 6b is a schematic side view of a motor vehicle seat according to the invention during a front collision at a medium angle of inclination of the backrest and low collision speed.

FIGS. 6a and 6b are side views of a motor vehicle seat 2 according to the invention in the pre-crash situation (FIG. 6a) and during a front collision (FIG. 6b) at an average angle of inclination of the backrest 5 and a low collision speed. The motor vehicle seat 2 has a seat surface 6, an adjustment system 8, and a headrest 4, as well as an adjustable-inclination backrest 5. The motor vehicle seat 2 is connected to the floor of the motor vehicle 1 via a seat longitudinal adjustment system 10, which has an upper rail 10.1 and a lower rail 10.2. The seat height adjustment system 9 has a rear 9.1 and a front kinematic system 9.2. In this embodiment, the seat height adjustment system 9 has the locking device V1, the adjustment system for the backrest inclination 8, and the locking device V2. In this embodiment, the force action F affects the motor vehicle seat 2 from the front, and the collision speed is low.

In the pre-crash situation (FIG. 6*a*), conventionally the backrest 5 is adjusted into the upright position through an angle of 10° by motor 200 ms before the front collision. 20 ms after the start of the accident (FIG. 6*b*), both locking devices V1, V2 are locked. The danger of the passenger sliding through under the belt restraint system is thus reduced, and the belt restraint system can better restrain the passenger. Likewise, in the pre-crash situation (FIG. 6*a*), the adjustment system for the angle of inclination (not shown) of the seat support (6) can be adjusted upward through an angle of 10° 200 ms before the front collision. 20 ms before the start of the accident (FIG. 6*b*), both locking devices V1, V2 are locked. The danger of the passenger sliding through under the belt restraint system is thus reduced, and the belt restraint system can better restrain the passenger.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for locking adjustment devices of a motor vehicle seat, said method comprising:
   detecting a usage situation and a danger situation;
   analyzing the usage situation and danger situation to determine a type of usage situation and a type of danger situation;
   selecting locking actions for two or more adjustment devices in response to the determined type of usage situation and the determined type of danger situation; and
   carrying out the selected locking actions for the adjustment devices.

2. The method of claim 1, further comprising detecting locking conditions for the adjustment devices from the detected usage situation and/or danger situation.

3. The method of claim 1, further comprising actuating locking devices of the adjustment devices.

4. The method of claim 3, wherein the locking devices are actuated by a safety ECU.

5. The method of claim 1, wherein the locking actions are implemented electromagnetically, pyrotechnically, by motor and/or via a memory metal.

6. The method of claim 1, wherein the usage situation is detected by detecting a person-specific feature.

7. The method of claim 6, wherein the person-specific feature includes different classifications into weight, size and/or age categories.

8. The method of claim 1, wherein the usage situation is detected by detecting a position of a passenger in the motor vehicle.

9. The method of claim 8, wherein when the position of the passenger is detected, a distinction is made between the motor vehicle seat used by the passenger and a seat situation or seat position of the passenger upon the motor vehicle seat.

10. The method of claim 1, wherein the danger situation is detected by classifying the danger situation.

11. The method of claim 10, wherein the danger situation is classified by distinguishing a crash type.

12. The method of claim 10, wherein the danger situation is classified by distinguishing the crash type between a pre-crash, front crash, rear crash, side impact and/or collision speed.

13. The method of claim 1, wherein the detecting the danger situation further comprises detecting a collision speed, and the selecting the locking actions is also in response to the detected collision speed.

* * * * *